US012557739B2

(12) United States Patent (10) Patent No.: US 12,557,739 B2
Ricketts et al. (45) Date of Patent: Feb. 24, 2026

(54) BALE WRAPPING SYSTEM

(71) Applicant: CNH Industrial America LLC, New Holland, PA (US)

(72) Inventors: Jonathan E. Ricketts, Davenport, IA (US); Martin J. Roberge, Saskatoon (CA)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 949 days.

(21) Appl. No.: 17/627,340

(22) PCT Filed: Jul. 16, 2020

(86) PCT No.: PCT/US2020/042349
§ 371 (c)(1),
(2) Date: Jan. 14, 2022

(87) PCT Pub. No.: WO2021/011783
PCT Pub. Date: Jan. 21, 2021

(65) Prior Publication Data
US 2022/0256773 A1      Aug. 18, 2022

Related U.S. Application Data

(60) Provisional application No. 62/874,854, filed on Jul. 16, 2019.

(51) Int. Cl.
A01F 15/07 (2006.01)
A01F 15/18 (2006.01)

(52) U.S. Cl.
CPC .......... A01F 15/0715 (2013.01); A01F 15/18 (2013.01); A01F 2015/077 (2013.01); A01F 2015/183 (2013.01)

(58) Field of Classification Search
CPC .................. A01F 15/0715; A01F 15/18; A01F 2015/077; A01F 2015/183; A01F 2015/0745; A01D 46/084
See application file for complete search history.

(56) References Cited

U.S. PATENT DOCUMENTS 3,674,139 A     7/1972   Manasian et al.
4,228,638 A     10/1980  Rabe et al.
(Continued)

FOREIGN PATENT DOCUMENTS

CA         2933770 A1     12/2017
CH         584140         1/1977
(Continued)

OTHER PUBLICATIONS

International Search Report and Written Opinion for PCT Application No. PCT/US2020/042349 dated Oct. 30, 2020 (15 pages).
(Continued)

*Primary Examiner* — Arpad Fabian-Kovacs
(74) *Attorney, Agent, or Firm* — Fletcher Yoder, P.C.

(57) ABSTRACT

A bale wrap includes a wrapping layer configured to wrap around a bale of agricultural product, such that a first portion of the wrapping layer overlaps a second portion of the wrapping layer. Additionally, the bale wrap includes an adhesive layer embedded on or in the wrapping layer and configured to be activated by an adhesive activation mechanism. Activation of the adhesive layer enables the adhesive layer to bond the first portion of the wrapping layer to the second portion of the wrapping layer.

16 Claims, 8 Drawing Sheets

(56) References Cited

U.S. PATENT DOCUMENTS

| | | | | |
|---|---|---|---|---|
| 5,324,078 | A * | 6/1994 | Bane | G09F 3/10 |
| | | | | 403/310 |
| 6,546,696 | B2 | 4/2003 | Cranston, III et al. | |
| 7,210,281 | B2 | 5/2007 | Viaud | |
| 7,625,332 | B2 * | 12/2009 | Mass | A01F 15/0715 |
| | | | | 428/56 |
| 7,954,633 | B2 | 6/2011 | Anstey et al. | |
| 9,374,945 | B2 | 6/2016 | Nes | |
| 10,264,732 | B2 | 4/2019 | Porter et al. | |
| 10,609,868 | B2 * | 4/2020 | Hummel | A01F 15/0715 |
| 10,960,639 | B2 * | 3/2021 | Castillo | B65B 11/04 |
| 11,006,580 | B2 * | 5/2021 | Gresset | A01F 15/08 |
| 11,142,382 | B1 * | 10/2021 | Hayes | C09J 7/20 |
| 12,041,883 | B2 * | 7/2024 | Roberge | A01F 15/0715 |
| 2002/0172792 | A1 * | 11/2002 | Jarvis | B29C 66/91411 |
| | | | | 156/227 |
| 2004/0250705 | A1 | 12/2004 | Underhill | |
| 2005/0034429 | A1 * | 2/2005 | Mass | B31D 1/0062 |
| | | | | 428/40.1 |
| 2006/0242931 | A1 * | 11/2006 | Ryse | A01F 15/0715 |
| | | | | 53/587 |
| 2009/0223197 | A1 | 9/2009 | Kohlbeck | |
| 2013/0160660 | A1 | 6/2013 | Roberge | |
| 2013/0221078 | A1 * | 8/2013 | Skelton | B65D 65/14 |
| | | | | 229/87.01 |
| 2016/0067105 | A1 | 3/2016 | Kirsh | |
| 2016/0177135 | A1 | 6/2016 | Allen | |
| 2016/0280404 | A1 * | 9/2016 | Porter | B65D 65/14 |
| 2016/0353665 | A1 | 12/2016 | Hummel et al. | |
| 2018/0084729 | A1 * | 3/2018 | Porter | A01F 15/071 |

FOREIGN PATENT DOCUMENTS

| | | | |
|---|---|---|---|
| CN | 1110287 | A | 10/1995 |
| CN | 103200811 | | 7/2013 |
| CN | 103963353 | | 8/2014 |
| CN | 105472968 | | 4/2016 |
| EP | 531885 | A1 | 3/1993 |
| EP | 1527674 | A1 | 5/2005 |
| JP | H02165989 | | 6/1990 |
| JP | 2002316389 | | 10/2002 |
| JP | 2006078733 | | 3/2006 |

OTHER PUBLICATIONS

AU Application No. 2020313961, Examination Report dated Apr. 7, 2025, 3 pgs.

BR Application No. BR112022000765-5, Office Action dated Jun. 26, 2025, 4 pgs.

EP Application No. 20840086, Communication, dated Mar. 27, 2025, 3 pgs.

EP Application No. 20840086, Extended Search Report, dated Jul. 12, 2023, 9 pgs.

CN Application No. 202080058856.8, Office Action and Translation, dated Dec. 9, 2022, 15 pgs.

CN Application No. 202080058856.8, Office Action and Translation, dated Jun. 29, 2023, 18 pgs.

CN Application No. 202080058856.8, Office Action and Translation, dated Oct. 13, 2023, 12 pgs.

CN Application No. 202080058856.8, Rejection Decision and Translation, dated Jan. 6, 2024, 13 pgs.

CN Application No. 202080058856.8, Board Opinion and Translation, dated Sep. 30, 2024, 16 pgs.

* cited by examiner

BALE WRAPPING SYSTEM

BACKGROUND

The present disclosure relates generally to a bale wrapping system.

Generally, baling implements (e.g., agricultural balers or packagers) are driven or towed through a field. The baling implements are utilized to harvest an agricultural product (e.g., cotton) from the field and to form the agricultural product into circular or rectangular bales. After forming the agricultural product into a bale, the bale may be wrapped with a wrapping material that secures the agricultural product and generally maintains a shape of the bale. Typically, the wrapping material includes plastic and is formed as a netting or a string that is wrapped around the bale.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, a bale wrap includes a wrapping layer configured to wrap around a bale of agricultural product, such that a first portion of the wrapping layer overlaps a second portion of the wrapping layer. Additionally, the bale wrap includes an adhesive layer embedded on or in the wrapping layer and configured to be activated by an adhesive activation mechanism. Activation of the adhesive layer enables the adhesive layer to bond the first portion of the wrapping layer to the second portion of the wrapping layer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
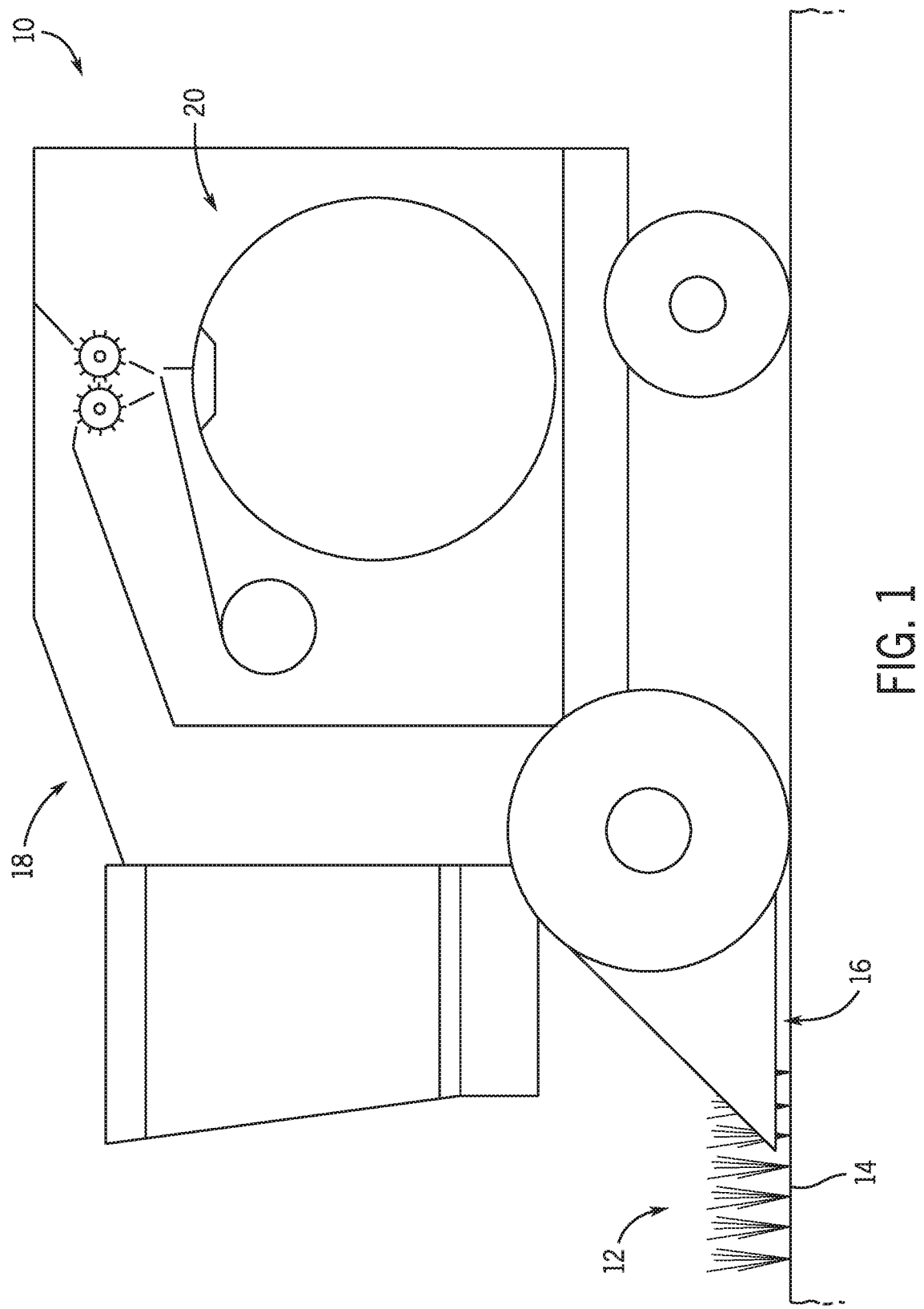
FIG. 1 is a side view of an embodiment of an agricultural implement, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include a bale wrapping system for an agricultural implement. Certain agricultural implements (e.g., harvesters) are configured to harvest an agricultural product (e.g., cotton and other agricultural products) and to form the agricultural product into a round or square bale. After forming the agricultural product into a bale, the bale wrapping system wraps the agricultural product with a bale wrap to secure the agricultural product and to generally maintain a shape of the bale. In certain embodiments, a bale wrap includes a wrapping layer and an adhesive layer embedded on or in the wrapping layer. The wrapping layer is configured to wrap around the bale, such that a first portion of the wrapping layer overlaps a second portion of the wrapping layer. The adhesive layer is configured to be activated (e.g., by the bale wrapping system) to bond and secure the first portion with the second portion to secure the bale wrap around the bale. In certain embodiments, the bale wrap includes a protective coating disposed on the adhesive layer that is configured to prevent activation of the adhesive layer.

Additionally, the bale wrapping system includes an adhesive activation mechanism configured to activate the adhesive layer. For example, the adhesive activation mechanism may include a brush configured to contact the protective coating and to rotate to remove the protective coating from the adhesive layer, thereby enabling the adhesive layer to bond the portions of the wrapping layer of the bale wrap. In certain embodiments, the adhesive activation mechanism may include a fluid application system configured to apply a fluid onto the protective coating to dissolve the protective coating and to remove the protective coating from the adhesive layer, thereby enabling the adhesive layer to bond the portions of the wrapping layer. In some embodiments (e.g., embodiments in which the protective coating is a temperature-activated coating), the adhesive activation mechanism may include a heat source configured to apply heat to the protective coating to melt the protective coating, thereby removing the protective coating from the adhesive layer and enabling the adhesive layer to bond the portions of the wrapping layer.

In certain embodiments, the protective coating may be omitted from the bale wrap, and the adhesive layer may be activated via the adhesive activation system. For example, the adhesive layer may be a temperature-activated adhesive, and the adhesive activation mechanism including the heat source may apply heat to the adhesive layer to activate the adhesive layer, thereby enabling the adhesive layer to bond portions of the wrapping layer. The adhesive activation mechanism may include the fluid application system configured to apply the fluid directly to the adhesive layer to activate the adhesive layer, thereby enabling the adhesive layer to bond portions of the wrapping layer. With the portions of the bale wrap coupled to one another, the bale wrap may secure the agricultural product within the bale and may maintain a shape of the bale.

With the foregoing in mind, the present embodiments relating to bale wrapping systems may be utilized within any suitable agricultural implement. For example, FIG. 1 is a side view of an embodiment of an agricultural implement 10 (e.g., a harvester). The agricultural implement 10 is configured to harvest agricultural product 12 (e.g., cotton) from a field 14 and to form the agricultural product 12 into bales. For example, the agricultural implement 10 includes drums 16 configured to harvest the agricultural product 12 from the field 14. Additionally, the agricultural implement 10 includes a pneumatic system 18 configured to flow the agricultural product 12 from the drums 16 to a packager 20 (e.g., baler or module builder). The packager 20 is supported and/or mounted within or on the agricultural implement 10. As illustrated, the packager 20 may form the agricultural product 12 into round bales. In certain embodiments, the packager of the agricultural implement may form the agricultural product into square bales, round bales, square modules, or a combination thereof. As described in greater detail below, after forming the agricultural product 12 into a bale, a bale wrapping system of the agricultural implement 10 wraps the agricultural product 12 with a bale wrap to secure the agricultural product 12 and to generally maintain a shape of the bale.

Figure 2:
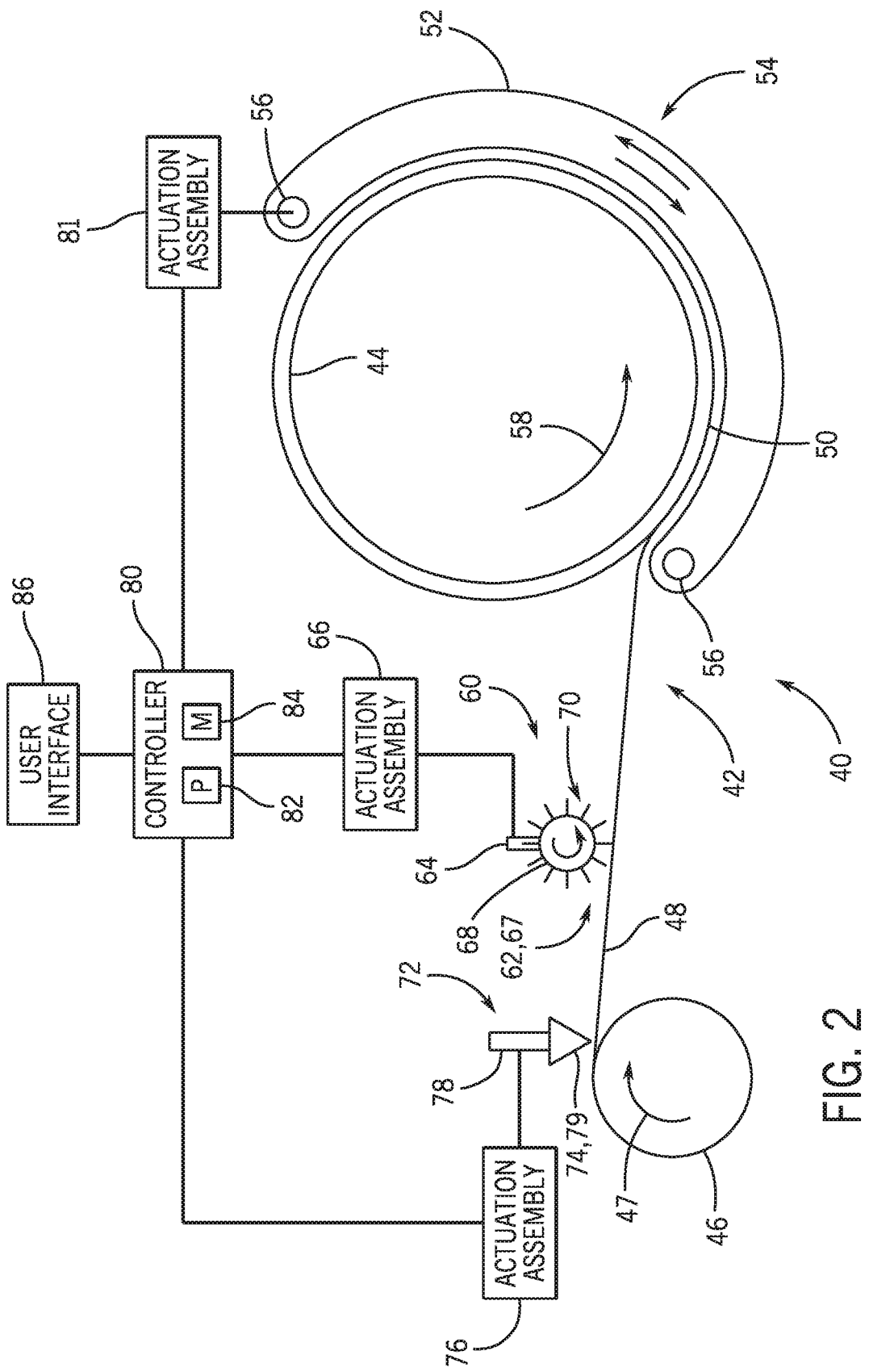
FIG. 2 is a side view of an embodiment of a bale wrapping system that may be employed in the agricultural implement of FIG. 1, in accordance with an aspect of the present disclosure.

FIG. 2 is a side view of an embodiment of a bale wrapping system 40 that may be employed in the agricultural implement of FIG. 1. A bale wrap 42 is configured to wrap around a bale 44 (e.g., a bale of the agricultural product or a module of the agricultural product) formed by the packager of the agricultural implement. In certain embodiments, the bale wrap 42 may be included in the bale wrapping system 40. In other embodiments, the bale wrap 42 may be omitted from the bale wrapping system 40. Prior to wrapping the bale 44, the bale wrap 42 is stored in a roll 46. The roll 46 is configured to rotate, as indicated by arrow 47, such that a portion 48 of the bale wrap 42 unrolls and extends generally from the roll 46 to the bale 44. For example, the bale wrapping system 40 may include power rollers and/or guides configured to unroll the bale wrap 42 from the roll 46 and to guide the portion 48 of the bale wrap 42 to the bale 44. The bale wrap 42 is configured to wrap around the bale 44 to secure the agricultural product within the bale 44 and to generally maintain a shape of the bale 44, such as the round shape in the illustrated embodiment. In other embodiments, the shape of the bale may be rectangular or other suitable shapes. As illustrated, a wrapped portion 50 of the bale wrap 42 is wrapped around the bale 44. The bale wrapping system 40 may wrap the bale 44 (e.g., with the wrapped portion 50 of the bale wrap 42) once or multiple times. For example, the wrapped portion 50 of the bale wrap 42 may include one layer, one layer and a portion of another layer, two layers, five layers, etc.

To wrap the bale 44, the bale wrapping system 40 includes a belt 52 configured to rotate, as indicated by arrows 54, to drive rotation of the bale 44. For example, one or more wheels 56 engaged with the belt 52 may drive rotation of the belt 52, thereby rotating the bale 44, as indicated by arrow 58. As the bale 44 rotates, the bale wrap 42 wraps around the bale 44, thereby forming the bale 44 and the wrapped portion 50 of the bale wrap 42. In certain embodiments, the bale 44 may be formed by other mechanisms.

As explained in greater detail below, the bale wrap 42 includes a wrapping layer and an adhesive layer embedded on or in the wrapping layer. The wrapping layer is configured to wrap around the bale 44. The wrapping layer may include cotton and/or other suitable materials (e.g., natural/harvested materials). In certain embodiments, the wrapping layer may include only cotton. Additionally, the wrapping layer may be a canvas, a fabric, a cloth, other material configurations, or a combination thereof. The adhesive layer is configured to bond a first portion of the wrapping layer (e.g., a first portion of the bale wrap) to a second portion of the wrapping layer (e.g., a second portion of the bale wrap) when activated. In certain embodiments, the bale wrap 42 includes a protective coating disposed on the adhesive layer that prevents the adhesive layer bonding portions the wrapping layer to one another (e.g., substantially reduces or eliminates the possibility of the adhesive layer bonding portions the wrapping layer to one another). In some embodiments, the protective coating may be omitted from the bale wrap 42.

The bale wrapping system 40 includes an adhesive activation system 60 configured to activate the adhesive layer of the bale wrap 42. In the illustrated embodiment, the adhesive activation system 60 includes an adhesive activation mechanism 62, a track 64, and an actuation assembly 66 coupled to the adhesive activation mechanism 62. The adhesive activation mechanism 62 is configured to move along the track 64 (e.g., toward and away from the bale wrap 42). In certain embodiments, the track may be omitted. As illustrated, the adhesive activation mechanism 62 includes a brush 67 having a wheel 68 and bristles 70 coupled to the wheel 68. The actuation assembly 66 is configured to drive rotation of the wheel 68, which causes rotation of the bristles 70. Additionally, the actuation assembly 66 is configured to drive movement of the adhesive activation mechanism 62 along the track 64. For example, the actuation assembly 66 may include actuator(s) and/or motor(s) configured to drive rotation of the adhesive activation mechanism 62 and movement of the adhesive activation mechanism 62 along the track 64. As the adhesive activation mechanism 62 is moved to an engagement position relative to the bale wrap 42, the bristles 70 of the adhesive activation mechanism 62 contact (e.g., engage) the protective coating of the bale wrap 42 at the portion 48 of the bale wrap 42 and remove the protective coating from the adhesive layer. In certain embodiments, the adhesive activation mechanism may include a rough surface (e.g., in place of the bristles) configured to engage and remove the protective coating from the bale wrap. After the adhesive activation mechanism 62 removes the protective coating, the adhesive layer is activated, thereby enabling the adhesive layer to bond portions of the wrapping layer of the bale wrap 42. As described in greater detail below, the protective coating may be omitted from the bale wrap, and the adhesive layer may be activated by other means.

With the adhesive layer activated, the adhesive layer on a first portion of the wrapping layer of the bale wrap 42 may bond the first portion to a second portion of the wrapping layer when the first portion and the second portion contact one another. Accordingly, the bale wrapping system 40 is configured to activate the adhesive layer of the bale wrap 42 when (e.g., only when) bonding the first portion of the wrapping layer of the bale wrap 42 with the second portion of the wrapping layer of the bale wrap 42 is desired. For example, after at least one full rotation (e.g., 1.1 rotations, 1.25 rotations, 1.5 rotations, 2 rotations, 2.5 rotations, etc.) of the bale wrap 42 around the bale 44, the adhesive activation mechanism 62 may engage the bale wrap 42 to activate the adhesive layer. Additionally, the engagement of the adhesive activation mechanism 62 with the bale wrap 42 may be maintained for a certain number of rotations (e.g., 0.01 rotation, 0.05 rotation, 0.1 rotation, 0.25 rotation, 0.5 rotation, 1 rotation, etc.) of the bale wrap 42 around the bale 44, such that only a portion of the adhesive layer along the bale wrap 42 is activated. The activated portion of the adhesive layer bonds the first and second portions of the wrapping layer of the bale wrap 42 to one another. In certain embodiments, the bale wrapping system 40 may wrap and secure the bale wrap 42 around a partial bale (e.g., a half bale, a three-quarter bale, etc.).

In the illustrated embodiment, the bale wrapping system 40 includes a cutting system 72 configured to cut the bale wrap 42 to a suitable length for wrapping of the bale 44. For example, the length of the bale wrap 42 may be selected based on a size of the bale 44 and a number of rotations that the bale wrap 42 is intended to wrap the bale 44, among other parameters. The cutting system 72 includes a cutting mechanism 74, an actuation assembly 76 coupled to the cutting mechanism 74, and a track 78. As illustrated, the cutting mechanism 74 includes a knife 79 configured to engage the bale wrap 42 to cut the bale wrap 42. In other embodiments, the cutting mechanism may include other suitable mechanism(s) configured to cut the bale wrap (e.g., a rotary knife, a duckbill knife, a saw, a shear bar, etc.). The actuation assembly 76 is configured to move the cutting mechanism 74 along the track 78 to selectively drive the cutting mechanism 74 into engagement with the bale wrap 42. In certain embodiments, the track may be omitted. Additionally, the actuation assembly 76 is configured to activate the cutting mechanism 74 while the cutting mechanism 74 is engaged with the bale wrap 42, such that the cutting mechanism 74 cuts the bale wrap 42. For example, the actuation assembly 76 may include actuator(s) and/or motor(s) configured to move the cutting mechanism 74 along the track and to activate the cutting mechanism 74, thereby enabling the cutting mechanism 74 to cut the bale wrap 42. In certain embodiments, the cutting mechanism 74 (e.g., the knife 79) may extend a width of the bale wrap 42, such that moving the cutting mechanism 74 downwardly to engage the bale wrap enables the cutting mechanism 74 to cut the bale wrap 42. In other embodiments, the cutting mechanism 74 may be drive along the width of the bale wrap 42 (e.g., by the actuation assembly 76), thereby enabling the cutting mechanism 74 to cut the bale wrap 42. In certain embodiments, the wrapping layer of the bale wrap 42 may have partially pre-cut sections (e.g., perforated sections), such as between strips of the adhesive layer, to facilitate cutting the bale wrap 42 by the cutting system 72. As illustrated, the cutting mechanism 74 is configured to cut the bale wrap 42 prior to engagement of the bale wrap 42 by the adhesive activation mechanism 62. In certain embodiments, the cutting mechanism may be configured to cut the bale wrap after engagement of the bale wrap by the adhesive activation mechanism.

A controller 80 of the bale wrapping system 40 is configured to control movement (e.g., rotation and linear movement) of the adhesive activation mechanism 62. For example, the controller 80 is communicatively coupled to the actuation assembly 66, the actuation assembly 76, and an actuation assembly 81. The controller 80 may control a rotation rate of the adhesive activation mechanism 62 and/or a position of the adhesive activation mechanism 62 (e.g., along the track 64). To control the rotation rate of the adhesive activation mechanism 62, the controller 80 may output an output signal to the actuation assembly 66 indicative of instructions to adjust the rotation rate of the wheel 68 of the adhesive activation mechanism 62. In certain embodiments, the rotation rate of the adhesive activation mechanism may be fixed, such that the rotation rate is not controlled by the controller. In response, the actuation assembly 66 may adjust the rotation rate of the wheel 68. To control the position of the adhesive activation mechanism 62 (e.g., along the track 64), the controller 80 may output an output signal to the actuation assembly 66 indicative of instructions to adjust the position of the wheel 68 (e.g., along the track 64). In response, the actuation assembly 66 may adjust the position of the wheel 68 along the track 64 (e.g., to move the adhesive activation mechanism 62 toward the engagement position and/or to move the adhesive activation mechanism 62 into a disengagement position in which the adhesive activation mechanism 62 is disengaged from the bale wrap 42).

Additionally, the controller 80 may be configured to control rotation of the belt 52 and/or a belt speed of the belt 52. For example, the controller 80 may control a rotation rate of one or more wheels 56 to control the rotation of the belt 52. The controller 80 may output an output signal to the actuation assembly 81 of the bale wrapping system 40 indicative of instructions to adjust the rotation rate of the wheel(s) 56. As illustrated, the actuation assembly 81 is coupled to one wheel 56 and is configured to drive rotation of the one wheel 56. In response to receiving the output signal, the actuation assembly 81 may adjust the rotation rate of the wheel 56 to adjust the belt speed of the belt 52. For example, the actuation assembly 81 may include actuator(s) and/or motor(s) configured to drive rotation of the wheel(s) 56, thereby driving rotation of the belt 52. In certain embodiments, the actuation assembly may be coupled to and configured to drive rotation of multiple wheels engaged with the belt. For example, the actuation assembly may include a separate motor and/or actuator configured to drive rotation of a respective wheel.

The controller 80 is configured to control movement and operation of the cutting system 72. For example, the controller 80 may control engagement of the cutting mechanism 74 with the bale wrap 42 and, in certain embodiments, activation of the cutting mechanism 74 (e.g., movement of the cutting mechanism 74 along the bale wrap 42). The controller 80 may output an output signal to the actuation assembly 76 of the cutting system 72 indicative of instructions to drive the cutting mechanism 74 to engage the bale wrap 42. In response to receiving the output signal, the actuation assembly 76 may adjust the position of the cutting mechanism 74 along the track 78 (e.g., move the cutting mechanism 74 downwardly to the bale wrap 42), such that the cutting mechanism 74 engages the bale wrap 42. Additionally, the controller 80 may output an output signal to the actuation assembly 76 indicative of instructions to activate the cutting mechanism 74. In response to receiving the output signal, the actuation assembly 76 may activate the cutting mechanism 74, such that the cutting mechanism 74 cuts the bale wrap 42.

In certain embodiments, the controller 80 may control the adhesive activation system 60, the cutting system 72, and the actuation assembly 81 in sequence and/or simultaneously. For example, based upon a determination that the bale 44 is in condition for wrapping, the controller 80 may first output the output signal to the actuation assembly 81 indicative of instructions to adjust the belt speed of the belt 52, such that the belt 52 reaches a target belt speed for wrapping the bale 44. The target belt speed may greater than or less than a belt speed for bale formation. In certain embodiments, there may not be a belt speed adjustment for wrapping of the bale 44 (e.g., the target belt speed may be equal to the belt speed for bale formation). The controller 80 may determine that the bale 44 is in condition for wrapping based on a weight of the bale 44, a duration of the bale forming process, instructions from another controller (e.g., an implement controller) to wrap the bale 44, feedback from a bale size sensor, other factors, or a combination thereof. As the bale 44 rotates, the bale wrap 42 wraps around the bale 44 for at least one full rotation of the bale 44. The controller 80 then outputs the output signal to the actuation assembly 66 of the adhesive activation system 60 indicative of instructions to drive the adhesive activation mechanism 62 into engagement with the protective coating at a first portion of the wrapping layer of the bale wrap 42. In response, the actuation assembly 66 may drive the adhesive activation mechanism 62 into engagement with the protective coating, such that the adhesive activation mechanism 62 activates the adhesive at the first portion of the wrapping layer (e.g., by removing the protective coating from the adhesive layer). Simultaneously or a selected duration thereafter, the controller 80 may output the output signal to the actuation assembly 76 of the cutting system 72 indicative of instructions to drive the cutting mechanism 74 into engagement with the bale wrap 42, thereby enabling the cutting mechanism 74 to cut bale wrap 42. In response, the actuation assembly 76 may drive the cutting mechanism 74 into engagement with the bale wrap, thereby enabling the cutting mechanism 74 to cut the bale wrap 42. Rotation of the belt 52 causes the bale wrap 42 to wrap around the bale 44. As such, the adhesive layer that is embedded in/on the first portion of the wrapping layer of the bale wrap 42 (e.g., the adhesive layer that is activated) may contact and adhere to a second portion of the wrapping layer of the bale wrap 42 (e.g., a backside and/or exterior surface of the wrapping layer that is wrapped around the bale 44) to secure the bale wrap 42 around the bale 44. Thereafter, the wrapped bale 44 is ejected from the agricultural implement.

As illustrated, the controller 80 of the bale wrapping system 40 includes a processor 82 and a memory 84. The processor 82 (e.g., a microprocessor) may be used to execute software, such as software stored in the memory 84 for controlling the bale wrapping system 40 (e.g., for controlling a rotation rate and position of the adhesive activation mechanism 62, etc.). Moreover, the processor 82 may include multiple microprocessors, one or more "general-purpose" microprocessors, one or more special-purpose microprocessors, and/or one or more application specific integrated circuits (ASICS), or some combination thereof. For example, the processor 82 may include one or more reduced instruction set (RISC) or complex instruction set (CISC) processors.

The memory 84 may include a volatile memory, such as random access memory (RAM), and/or a nonvolatile memory, such as read-only memory (ROM). The memory 84 may store a variety of information and may be used for various purposes. For example, the memory 84 may store processor-executable instructions (e.g., firmware or software) for the processor 82 to execute, such as instructions for controlling the bale wrapping system 40. In certain embodiments, the controller 80 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., the position and the rotation rate of the adhesive activation mechanism 62), instructions (e.g., software or firmware for controlling the bale wrapping system 40), and any other suitable data. The processor 82 and/or the memory 84, and/or an additional processor and/or memory device, may be located in any suitable portion of the system. For example, a memory device for storing instructions (e.g., software or firmware for controlling portions of the bale wrapping system 40) may be located in or associated with the bale wrapping system 40.

Additionally, the bale wrapping system 40 includes a user interface 86 communicatively coupled to the controller 80. The user interface 86 may be configured to inform an operator of the position and/or the rotation rate of the adhesive activation mechanism 62, the belt speed of the belt 52, an amount of the bale wrap 42 remaining on the roll 46, a size of the bale 44, or a combination thereof. Additionally, the user interface 86 may be configured to enable operator interactions with the bale wrapping system 40, such control of the adhesive activation system 60, control of the cutting system 72, control of the actuation assembly 81, or a combination thereof. For example, the user interface 86 may include a display and/or other user interaction devices (e.g., buttons) configured to enable operator interactions.

Figure 3:
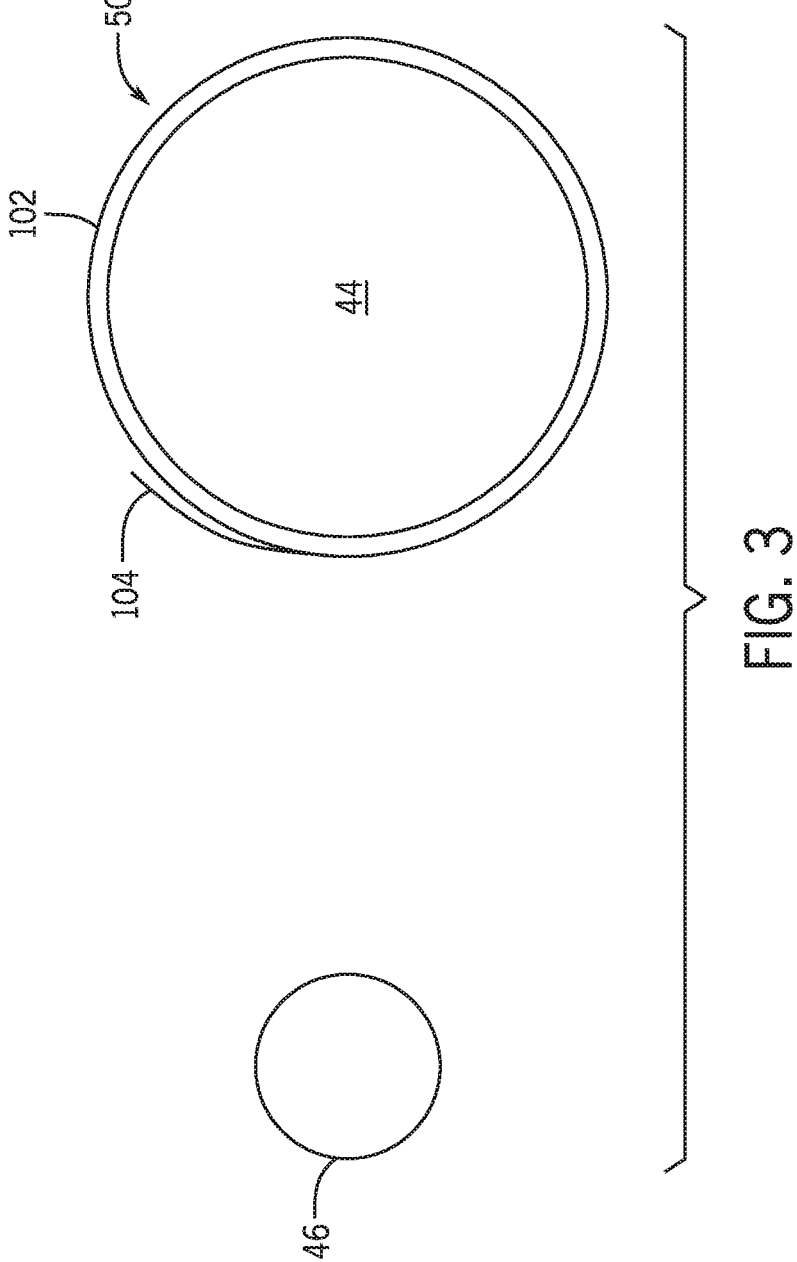
FIG. 3 is a side view of an embodiment of a wrapped bale, in accordance with an aspect of the present disclosure.

FIG. 3 is a side view of the roll 46 of the bale wrap 42 and the wrapped portion 50 of the bale wrap 42 that is wrapped around the bale 44. As illustrated, the bale wrap 42 is cut, such that the roll 46 is separate from the wrapped portion 50 of the bale wrap 42. The wrapped portion 50 of the bale wrap 42 includes a first portion 102 (e.g., a first section) of the wrapping layer of the bale wrap 42 wrapped completely around the bale 44 and a second portion 104 (e.g., a second section) of the wrapping layer wrapped partly around the bale 44, such that the first portion 102 and the second portion 104 overlap. In certain embodiments, the bale wrapping system may wrap the bale 44 multiple times, such that the first portion 102 includes multiple layers of the wrapping layer of the bale wrap 42.

As described above, the adhesive activation mechanism is configured to activate the adhesive layer of the bale wrap 42 to enable the adhesive layer to bond portions of the bale wrap 42 to one another. For example, as the second portion 104 of the wrapping layer engages the adhesive activation mechanism, the adhesive activation mechanism may activate the adhesive layer at the second portion 104 of the wrapping layer of the bale wrap 42 (e.g., may remove the protective coating from the second portion 104). As the second portion 104 reaches the bale 44 (e.g., reaches the first portion 102 of the wrapped portion 50), the second portion 104 contacts the first portion 102, and the activated adhesive layer directly bonds the first portion 102 and the second portion 104 to one another. The bonding of the first portion 102 and the second portion 104 by the adhesive layer secures the bale wrap 42 around the bale 44 (e.g., secures the wrapped portion 50 of the bale wrap 42 around the bale 44), thereby securing the agricultural product within the bale 44. The bale wrapping system may be configured to wrap and to secure the bale wrap 42 around the bale 44 without the adhesive layer of the bale wrap 42 contacting the agricultural product or the belts of the agricultural implement.

Figure 4:
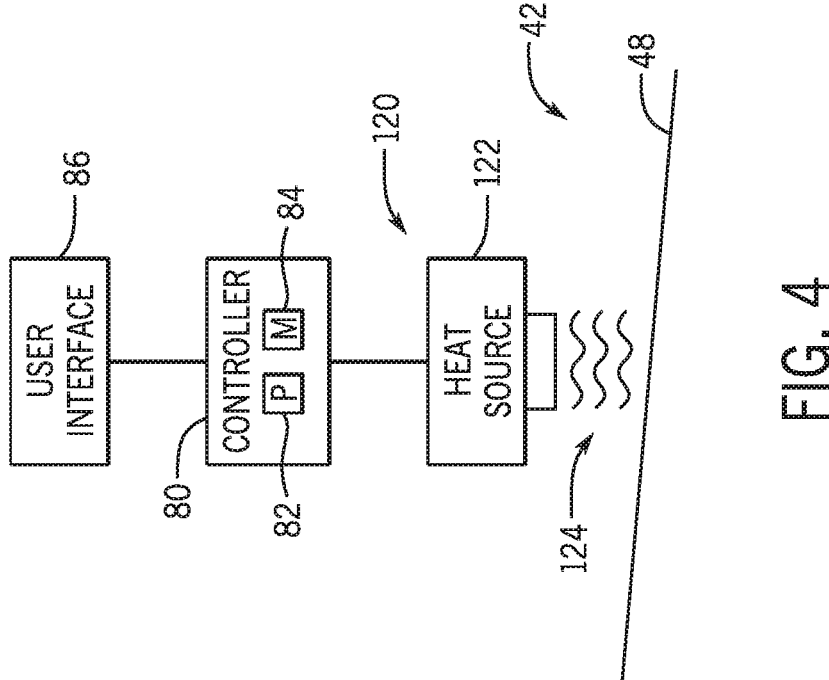
FIG. 4 is a side view of an embodiment of an adhesive activation system that may be employed in the bale wrapping system of FIG. 2, in accordance with an aspect of the present disclosure.

FIG. 4 is a side view of another embodiment of an adhesive activation system 120 that may be employed in the bale wrapping system of FIG. 2. The adhesive activation system 120 includes an adhesive activation mechanism 122 configured to activate the adhesive layer of the bale wrap 42. As illustrated, the adhesive activation mechanism 122 includes a heat source (e.g., a heater) configured to emit heat 124 toward the bale wrap 42. In certain embodiments, the protective coating on the adhesive layer of the bale wrap 42 may be configured to melt in response to application of the heat. As such, the heat 124 applied by the heat source may melt the protective coating, thereby causing the protective coating to disengage the adhesive layer. As a result, the adhesive layer is activated, which enables the adhesive layer to bond portions of the wrapping layer of the bale wrap 42 to one another. In some embodiments, the adhesive activation mechanism 122 may be configured to apply heat to both the protective coating and the adhesive layer to activate the adhesive layer.

In certain embodiments, the adhesive layer of the bale wrap 42 may be temperature-activated, and the protective coating may be omitted. For example, the adhesive activation mechanism 122 may apply the heat 124 directly to the adhesive layer to activate the adhesive layer and to enable the adhesive layer to bond portions of the wrapping layer to one another. In certain embodiments, instead of or in addition providing the heat 124, the adhesive activation mechanism 122 may be configured to apply electromagnetic radiation (e.g., infrared radiation, ultraviolet radiation, etc.) to the protecting coating to remove the protective coating from the adhesive, thereby activating the adhesive.

The controller 80 of the bale wrapping system is configured to control the heat 124 applied by the adhesive activation mechanism 122 to facilitate activation of the adhesive layer of the bale wrap 42. For example, the controller 80 may output an output signal to the adhesive activation mechanism 122 indicative of instructions to apply the heat 124 to the bale wrap 42. In response to receiving the output signal, the adhesive activation mechanism 122 may apply the heat 124 to the bale wrap 42 (e.g., to the protective coating and/or to the adhesive layer of the bale wrap 42). In certain embodiments, the controller 80 may control/adjust a magnitude of the heat 124 applied by the adhesive activation mechanism 122, a time period during which the heat 124 is applied by the adhesive activation mechanism 122, and other aspects of the adhesive activation system 120.

Figure 5:
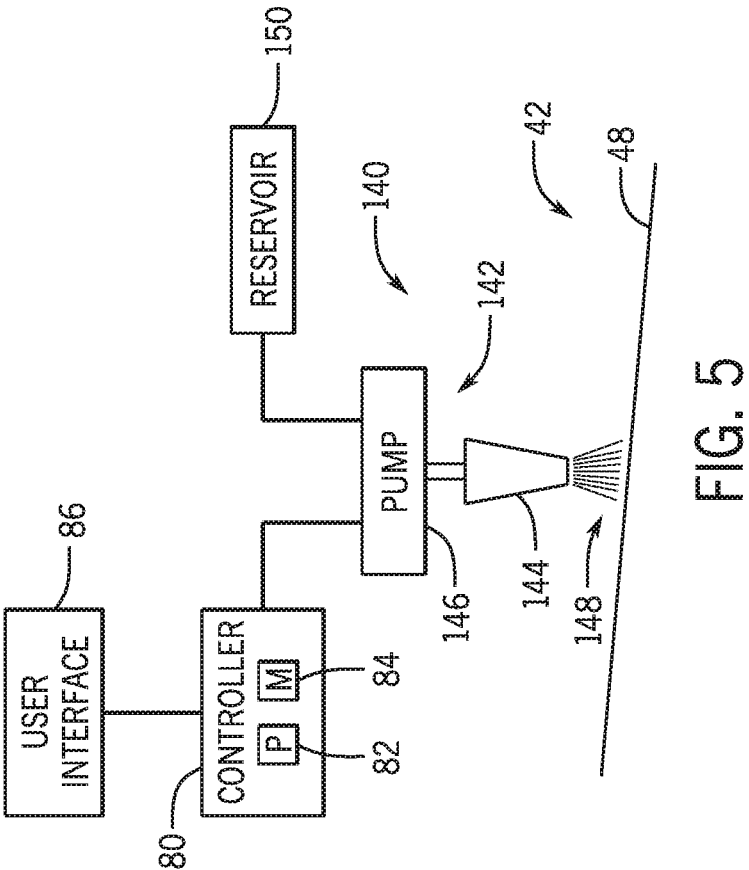
FIG. 5 is a side view of another embodiment of an adhesive activation system that may be employed in the bale wrapping system of FIG. 2, in accordance with an aspect of the present disclosure.

FIG. 5 is a side view of another embodiment of an adhesive activation system 140 that may be employed in the bale wrapping system of FIG. 2. The adhesive activation system 140 includes an adhesive activation mechanism 142 configured to activate the adhesive layer of the bale wrap 42. In the illustrated embodiment, the adhesive activation mechanism 122 includes a nozzle 144 and a pump 146 (e.g., a fluid application system) configured to output fluid 148 (e.g., water) through the nozzle 144 toward the bale wrap 42. The pump 146 is configured to pump the fluid 148 from a reservoir 150 configured to store the fluid 148. The protective coating on the adhesive layer of the bale wrap 42 may be configured to dissolve and/or wash off the adhesive layer in response to the application of the fluid 148 to the protective coating. As such, the fluid 148 applied by the adhesive activation mechanism 142 is configured to remove the protective coating from the adhesive layer, thereby activating the adhesive layer and enabling the adhesive layer to bond portions of the wrapping layer of the bale wrap 42 to one another. In certain embodiments, the adhesive layer of the bale wrap may be fluid-activated, and the protective coating may be omitted. For example, the adhesive activation mechanism may apply the fluid directly to the adhesive layer to activate the adhesive layer and to enable the adhesive layer to bond portions of the wrapping layer to one another.

In certain embodiments, the adhesive activation system 142 may apply the fluid 148 to the protective coating first to remove the protective coating and to the adhesive layer second to activate the adhesive layer. In some embodiments, the adhesive activation system 142 may apply a first fluid to the protective coating to remove the protective coating and a second fluid to the adhesive to activate the adhesive. In certain embodiments, the protective coating may be omitted, and the adhesive activation system 142 may apply the fluid 148 to adhesive layer to activate the adhesive layer, thereby enabling the adhesive layer to bond portions of the wrapping layer to one another.

The controller 80 of the bale wrapping system is configured to control the fluid 148 applied by the adhesive activation mechanism 142 to control activation of the adhesive layer of the bale wrap 42. For example, the controller 80 may output an output signal to the adhesive activation mechanism 142 (e.g., to the pump 146 of the adhesive activation mechanism 142 and/or the nozzle 144 of the adhesive activation mechanism 142) indicative of instructions to apply the fluid 148 to the bale wrap 42. In response to receiving the output signal, the pump 146 may pump the fluid 148 from the reservoir 150, through the nozzle 144, and toward the bale wrap 42 (e.g., toward the protective coating and/or toward the adhesive layer of the bale wrap 42). Additionally or alternatively, in response to receiving the output signal, the nozzle 144 may apply the fluid 148 to the protective coating. In certain embodiments, the controller 80 may control/adjust a flow rate of the fluid 148 out of the nozzle 144 and other aspects of the adhesive activation system 140.

In certain embodiments, the bale wrapping system may remove the protective coating from the adhesive layer with a first device, such as the brush, the heat source, or the pump/nozzle, and may activate the adhesive with a second device, such as the brush, the heat source, or the pump/nozzle. For example, the bale wrapping system may brush the protective coating off the adhesive layer with the brush and may apply the fluid via the pump/nozzle to the adhesive layer to activate the adhesive layer, thereby enabling the adhesive layer to bond portions of the wrapping layer of the bale wrap.

Figure 6:
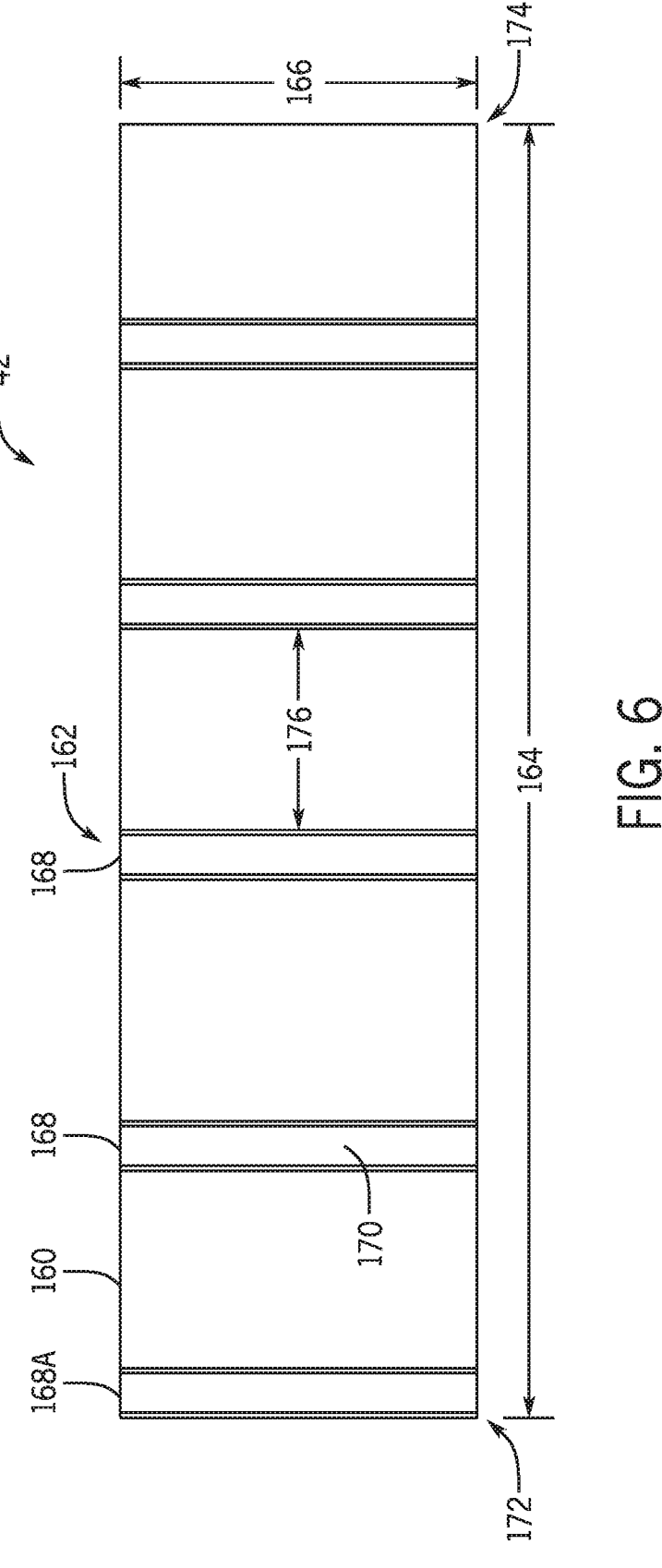
FIG. 6 is a top view of an embodiment of a bale wrap that may be employed in the bale wrapping system of FIG. 2, in accordance with an aspect of the present disclosure.

FIG. 6 is a top view of the bale wrap 42 of the bale wrapping system of FIG. 2. The bale wrap 42 includes a wrapping layer 160 and an adhesive layer 162 embedded on and/or in the wrapping layer 160 (e.g., the adhesive layer 162 may extend into the wrapping layer 160). In certain embodiments, the adhesive layer may only be disposed on an interior side of the wrapping layer. In certain embodiments, the wrapping layer 160 extends along an entire length 164 of the bale wrap 42 and along an entire width 166 of the bale wrap 42. The adhesive layer 162 forms strips 168 extending along the entire width 166. In certain embodiments, the adhesive layer may extend along the entire length of the bale wrap. Additionally or alternatively, the adhesive layer may be disposed in other arrangements (e.g., strips extending along the length of the bale wrap, blocks of the adhesive layer in a checkerboard pattern, etc.). The length 164 may be any suitable length, such that the wrapping layer 160 may wrap around the bale. For example, the length 164 may be 6 meters, 7 meters, 8 meters, 8.1 meters, 8.3 meters, 8.5 meters, 8.7 meters, 8.6 meters, 8.62 meters, 9 meters, 10 meters, 11 meters, 15 meters, between 6 meters and 11 meters, between 7 meters and 10 meters, between 8 meters and 9 meters, between 8 meters and 9 meters, and other suitable distances. The wrapping layer 160 may include cotton and may be formed as a fabric, canvas, cloth, or a combination thereof. In certain embodiments, the wrapping layer 160 may include water repellant materials/components. In some embodiments, the wrapping layer 160 may be or may include an organic impermeable layer made of algae(s) and/or other organic materials.

In certain embodiments, the bale wrap 42 also includes a protective coating 170 disposed on the adhesive layer 162 (e.g., on the strips 168 of the adhesive layer 162). In some embodiments, the protective coating 170 may be omitted from the bale wrap 42. In some embodiments, the protective coating may be disposed on some or all of the wrapping layer and/or may be disposed on the entire bale wrap. The protective coating 170 is configured to block (e.g., prevent) activation of the adhesive layer 162. For example, in certain embodiments, the protective coating 170 may form a barrier between the adhesive layer 162 and other fluids/energy sources that may activate the adhesive layer 162. The adhesive activation mechanism is configured to engage the protective coating 170 and to remove the protective coating 170 from the adhesive layer 162, thereby facilitating activation of the adhesive layer. Furthermore, in certain embodiments, removal of the protective coating 170 may activate the adhesive layer 162 (e.g., simply by exposing the adhesive). In certain embodiments, the adhesive activation mechanism may be controlled to activate only portions of the adhesive layer 162. For example, the adhesive activation mechanism may activate only certain strips 168 (e.g., one strip, two strips, three strips, etc.) of the adhesive layer 162 and/or only strips 168 at certain locations along the length 164 of the bale wrap 42 (e.g., only one strip 168A at a first end 172 of the bale wrap 42). In embodiments without the protective coating 170, the adhesive layer 162 may be configured to activate by other means.

The adhesive layer 162 is configured to bond portions of the wrapping layer 160 of the bale wrap 42 to one another in response to activation of the adhesive layer 162. For example, after the bale wrap 42 is wrapped around the bale and certain strips 168 of the adhesive layer 162 are activated, the activated strips 168 in contact with another portion of the wrapping layer 160 of the bale wrap 42 (e.g., an exterior surface and/or a backside of the wrapping layer 160) may bond portions of the wrapping layer 160 to one another.

In certain embodiments, a peripheral length (e.g., a circumference) of the bale may be less the length 164 of the bale wrap 42, such that the first end 172 of the bale wrap 42 overlaps with an opposite second end 174 of the bale wrap 42. The cutting mechanism of the bale wrapping system may be controlled to cut the bale wrap 42 to the length 164, such that the ends 172 and 174 are formed due to the bale wrap 42 being cut to the length 164. The overlapping portions of the wrapping layer of the bale wrap 42 may include at least one strip 168 of the adhesive layer 162 that has been activated by the adhesive activation mechanism, such that the overlapping portions of the wrapping layer are bonded to one another. In certain embodiments, only the strip 168A may be activated and may contact the exterior surface and/or the backside of the wrapping layer 160 to secure the portions of the wrapping layer 160 to one another and to secure the bale wrap 42 around the bale.

As illustrated, each strip 168 of the adhesive layer 162 is separated by a distance 176 (e.g., a distance between adjacent strips 168). The distance 176 may be any suitable distance, such as 0.1 meters, 0.2 meters, 0.5 meters, 1 meter, 2 meters, 3 meters, 4 meters, 5 meters, 6 meters, 7 meters, 8 meters, 8.1 meters, 8.3 meters, 8.5 meters, 8.7 meters, 8.6 meters, 8.62 meters, 9 meters, 10 meters, 11 meters, 15 meters, between 0.1 and 1 meter, between 1 meter and 2 meters, between 1 meter and 3 meters, between 2 meter and 5 meters, between 6 meters and 11 meters, between 7 meters and 10 meters, between 8 meters and 9 meters, and other suitable distances.

In certain embodiments, the bale wrap 42 may be cut to a different length having more or fewer strips 168 of the adhesive layer 162 (e.g., one strip 168, two strips 168, three strips 168, four strips 168, six strips 168, eight strips 168, ten strips 168, fifteen strips 168, etc.). For example, to accommodate wrapping bales of different sizes, the bale wrap 42 may be cut to a different length having a different number of strips 168.

Figure 7:
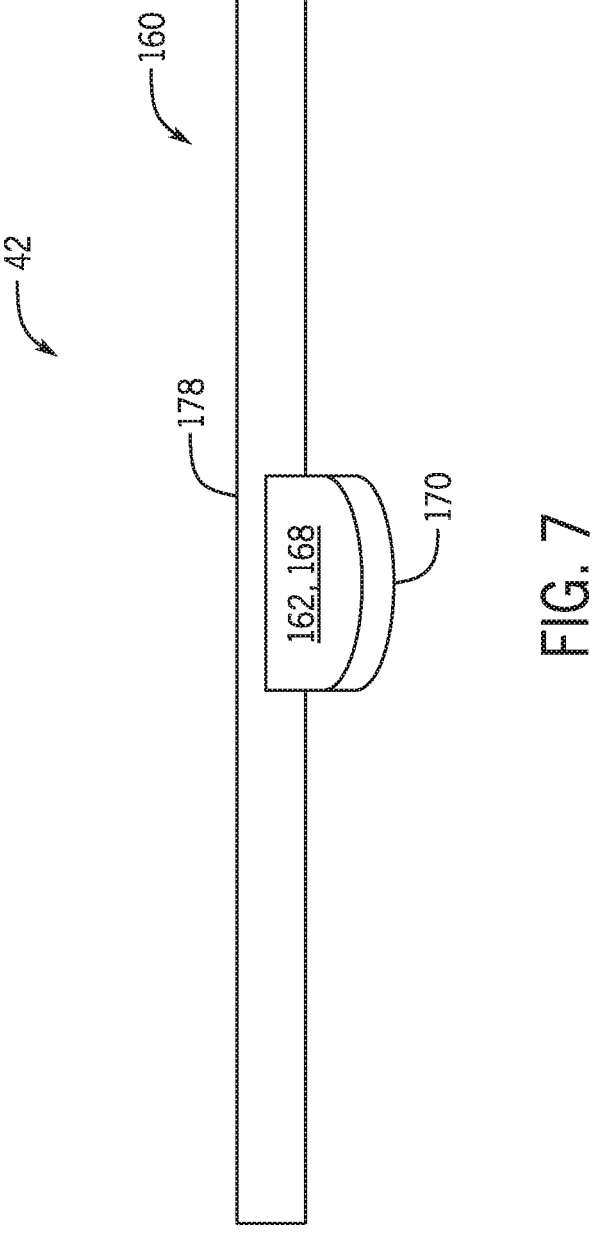
FIG. 7 is a cross-sectional view of the bale wrap of FIG. 6, in accordance with an aspect of the present disclosure.

FIG. 7 is a cross-sectional view of the bale wrap 42 of FIG. 6. As illustrated, the strip 168 of the adhesive layer 162 is embedded on and in the wrapping layer 160 of the bale wrap 42. For example, the adhesive layer 162 protrudes into and extends from the wrapping layer 160. In certain embodiments, the adhesive layer may be disposed only on or only in the wrapping layer. Additionally, the protective coating 170 is disposed on the adhesive layer 162. The adhesive activation mechanism is configured to remove the protective coating 170 from the adhesive layer 162 to activate the adhesive layer 162, thereby enabling the adhesive layer 162 to bond portions of the bale wrap 42 to one another while the bale wrap is wrapped around the bale. For example, after being wrapped around the bale, the adhesive layer 162 (e.g., the activated adhesive layer) may contact and adhere to an exterior surface 178 of the wrapping layer 160. The adherence of the adhesive layer 162 to the exterior surface 178 of the wrapping layer 160 bonds the portion of the wrapping layer 160 having the adhesive layer 162 (e.g., having the activated adhesive layer) to the exterior surface 178 of the wrapping layer 160, such that the wrapping layer 160 is secured around the bale. In certain embodiments, the protective coating 170 may be omitted from the bale wrap 42, and the adhesive layer 162 may be activated by other means.

Figure 8:
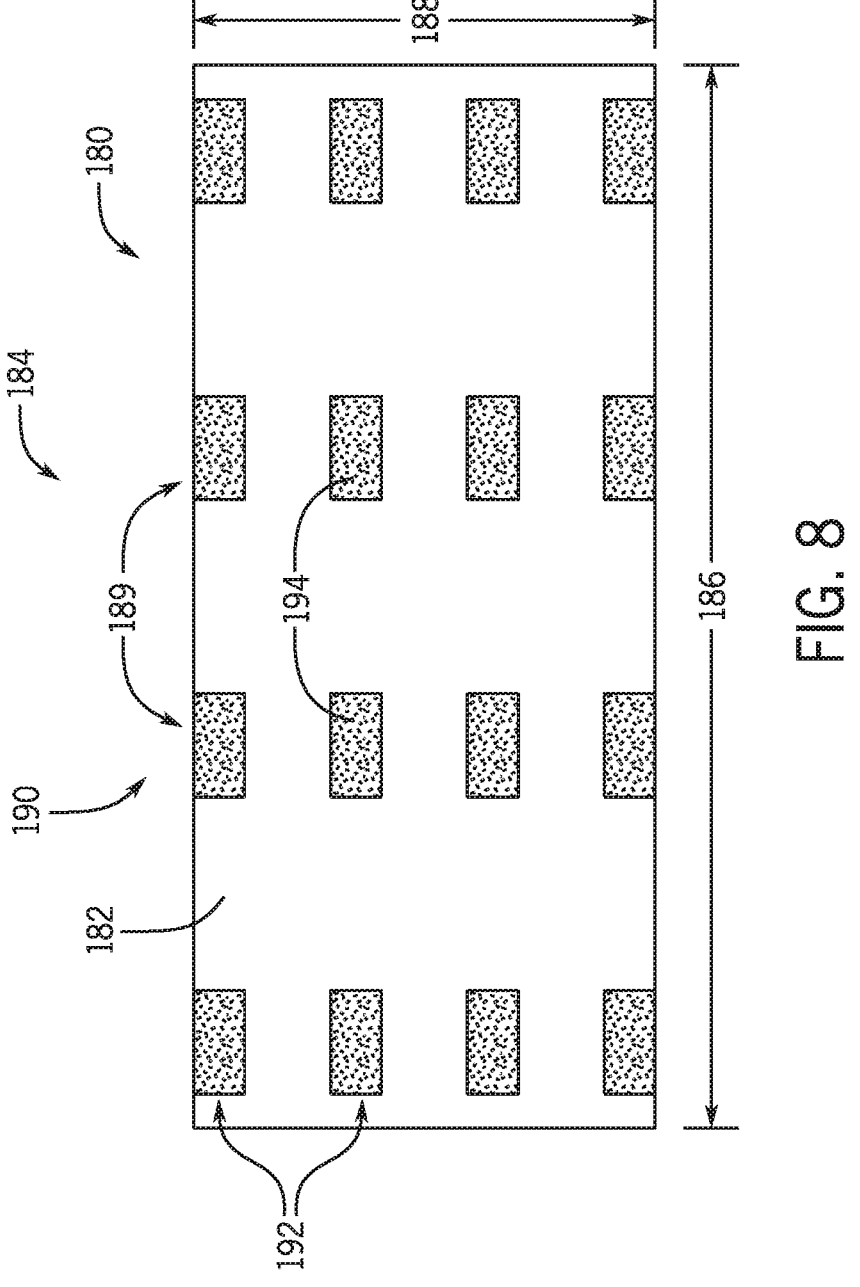
FIG. 8 is a top view of another embodiment of a bale wrap that may be employed in the bale wrapping system of FIG. 2, in accordance with an aspect of the present disclosure.

FIG. 8 is a top view of another embodiment of a bale wrap 180 that may be employed in the bale wrapping system of FIG. 2. The bale wrap 180 includes a wrapping layer 182 and an adhesive layer 184 embedded on and/or in the wrapping layer 182 (e.g., the adhesive layer 184 may extend into the wrapping layer 182). In certain embodiments, the adhesive layer may only be disposed on an interior side of the wrapping layer. In certain embodiments, the wrapping layer 182 extends along an entire length 186 of the bale wrap 180 and along an entire width 188 of the bale wrap 180. The adhesive layer 184 forms blocks 189 arranged in strips 190 extending along portions of the width 188 and rows 192 extending along portions of the length 186.

The bale wrap 180 also includes a protective coating 194 disposed on the adhesive layer 184. In some embodiments, the protective coating 194 may be omitted from the bale wrap 180. In some embodiments, the protective coating may be disposed on some or all of the wrapping layer and/or may be disposed on the entire bale wrap. The protective coating 194 is configured to block (e.g., prevent) activation of the adhesive layer 184. For example, in certain embodiments, the protective coating 194 may form a barrier between the adhesive layer 184 and other fluids/energy sources that may activate the adhesive layer 184. The adhesive activation mechanism is configured to engage the protective coating 194 and to remove the protective coating 194 from the adhesive layer 184, thereby facilitating activation of the adhesive layer 184. Furthermore, in certain embodiments, removal of the protective coating 194 may activate the adhesive layer 184 (e.g., simply by exposing the adhesive). In certain embodiments, the adhesive activation mechanism may be controlled to activate only portions of the adhesive layer 184. For example, the adhesive activation mechanism may activate only certain blocks 189 of the adhesive layer 184, certain strips 190 of the adhesive layer 184, and/or certain rows 192 of the adhesive layer 184.

The adhesive layer 184 is configured to bond portions of the wrapping layer 182 of the bale wrap 180 to one another in response to activation of the adhesive layer 184. For example, after the bale wrap 180 is wrapped around the bale and certain blocks 189 of the adhesive layer 184 are activated, the activated blocks 189 in contact another portion of the wrapping layer 182 of the bale wrap 180 (e.g., an exterior surface and/or a backside of the wrapping layer 182) may bond portions of the wrapping layer 182 to one another to secure the bale wrap 180 around the bale.

In certain embodiments, a peripheral length of the bale (e.g., a circumference) may be less the length 186 of the bale wrap 180, such that a first end 196 of the bale wrap 180 overlaps with an opposite second end 198 of the bale wrap 180. The overlapping portions of the wrapping layer 182 may include at least one strip 190 of the adhesive layer 184 that has been activated by the adhesive activation mechanism, such that the overlapping portions of the wrapping layer 182 bond to one another to secure the bale wrap 180 around the bale.

The embodiments of a bale wrapping system described herein may facilitate wrapping of bales of agricultural product. A bale wrap having a wrapping layer, an adhesive layer embedded on or in the wrapping layer, and a protective coating on the adhesive layer. The wrapping layer is configured to wrap around the bale, such that a first portion of the wrapping layer overlaps a second portion of the wrapping layer. The adhesive layer is configured to activate to bond and secure the first portion with the second portion to secure the bale wrap around the bale. The protective coating is configured to prevent activation of the adhesive layer. In certain embodiments, the bale wrapping system may include the bale wrap. In other embodiments, the bale wrap may be omitted from the bale wrapping system.

Additionally, the bale wrapping system includes an adhesive activation mechanism configured to activate the adhesive layer. For example, the adhesive activation mechanism may include a brush configured to contact the protective coating and to rotate to the remove the protective coating from the adhesive layer. In certain embodiments, the adhesive activation mechanism may include a fluid application system configured to spray fluid (e.g., water) onto the protective coating to dissolve the protective coating and to remove the protective coating from the adhesive layer. In some embodiments, the adhesive activation mechanism may include a heat source configured to apply heat to the protective coating to melt the protective coating, thereby removing the protective coating from the adhesive layer (e.g., the protective coating may be a temperature-activated coating). In certain embodiments, the protective coating may be omitted from the bale wrap, and the adhesive layer may be activated directly by the adhesive activation mechanism, such as by the heat source and/or by the fluid application system. As the adhesive layer is activated, the adhesive layer bonds the portions of the wrapping layer of the bale wrap. Accordingly, the adhesive layer may secure the bale wrap around the bale, thereby securing the agricultural product within the bale and maintaining a shape of the bale.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A bale wrap, comprising:
   a wrapping layer configured to wrap around a bale of agricultural product, such that a first portion of the wrapping layer overlaps a second portion of the wrapping layer;
   an adhesive layer embedded on or in the wrapping layer, wherein the adhesive layer is configured to be activated by an adhesive activation mechanism, and activation of the adhesive layer enables the adhesive layer to bond the first portion of the wrapping layer to the second portion of the wrapping layer; and
   a protective coating disposed on the adhesive layer, wherein the protective coating prevents the adhesive layer from bonding sections of the wrapping layer to one another, the protective coating is configured to block activation of the adhesive layer, and the protective coating is configured to be removed by one of a brush configured to contact the protective coating, a fluid applied onto the protective coating, or heat sufficient to melt the protective coating, to activate or enable activation of the adhesive layer.

2. The bale wrap of claim 1, wherein the adhesive layer comprises strips extending along a width of the bale wrap.

3. The bale wrap of claim 2, wherein a distance between opposing strips of the adhesive layer is between one meter and two meters.

4. The bale wrap of claim 1, wherein the wrapping layer comprises cotton and is formed as a canvas, fabric, cloth, or a combination thereof.

5. The bale wrap of claim 1, wherein a length of the wrapping layer is between eight meters and nine meters.

6. The bale wrap of claim 1, wherein the first portion of the wrapping layer is coupled to the adhesive layer, and the second portion of the wrapping layer comprises an exterior surface of the wrapping layer configured to contact the adhesive layer when the bale wrap is wrapped around the bale.

7. The bale wrap of claim 1, wherein the adhesive layer is configured to be activated by application of the fluid or another fluid onto the adhesive layer.

8. The bale wrap of claim 1, wherein the adhesive layer is configured to be activated by application of heat to the adhesive layer.

9. A bale wrapping system, comprising:

a belt configured to rotate to form and drive rotation of a bale of agricultural product, wherein the bale is configured to be wrapped with a wrapping layer of a bale wrap while rotating on the belt, such that a first portion of the wrapping layer overlaps a second portion of the wrapping layer while disposed on the belt; and an adhesive activation mechanism configured to remove a protective coating disposed on an adhesive layer of the bale wrap and to activate the adhesive layer of the bale wrap, wherein the protective coating prevents the adhesive layer from bonding sections of the wrapping layer to one another, the protective coating is configured to block activation of the adhesive layer, removal of the protective coating activates or enables activation of the adhesive layer, activation of the adhesive layer enables the adhesive layer to bond the first portion of the wrapping layer to the second portion of the wrapping layer, and the adhesive activation mechanism comprises:

a brush configured to contact and remove the protective coating;

a pump and a nozzle fluidly coupled to the pump, wherein the pump is configured to pump fluid through the nozzle and onto the protective coating to remove the protective coating; or a heat source configured to apply heat to and melt the protective coating to remove the protective coating.

10. The bale wrapping system of claim 9, comprising a cutting mechanism configured to cut the bale wrap to a length enabling the first portion of the wrapping layer to overlap with the second portion of the wrapping layer when wrapped around the bale.

11. The bale wrapping system of claim 9, wherein the adhesive activation mechanism comprises the heat source, and the heat source is configured to apply heat directly to and melt the adhesive layer to activate the adhesive layer.

12. The bale wrapping system of claim 9, wherein the adhesive activation mechanism comprises the pump and the nozzle, and the pump is configured to pump the fluid through the nozzle and onto the adhesive layer to activate the adhesive layer.

13. A bale wrapping system, comprising:

a bale wrap, comprising:

a wrapping layer configured to wrap around a bale of agricultural product, such that a first portion of the wrapping layer overlaps a second portion of the wrapping layer;

an adhesive layer embedded on or in the wrapping layer; and a protective coating disposed on the adhesive layer, wherein the protective coating prevents the adhesive layer from bonding sections of the wrapping layer to one another, and the protective coating is configured to block activation of the adhesive layer; and an adhesive activation mechanism configured to remove the protective coating from the adhesive layer and to activate the adhesive layer, wherein activation of the adhesive layer enables the adhesive layer to bond the first portion of the wrapping layer to the second portion of the wrapping layer, and the adhesive activation mechanism comprises:

a brush configured to contact and remove the protective coating;

a pump and a nozzle fluidly coupled to the pump, wherein the pump is configured to pump fluid through the nozzle and onto the protective coating to remove the protective coating; or a heat source configured to apply heat to and melt the protective coating to remove the protective coating.

14. The bale wrapping system of claim 13, wherein the wrapping layer comprises cotton and is formed as a canvas, fabric, cloth, or a combination thereof.

15. The bale wrapping system of claim 13, wherein the adhesive layer is configured to be activated by application of the fluid or another fluid to the adhesive layer.

16. The bale wrapping system of claim 13, wherein the adhesive layer is configured to be activated by application of heat to the adhesive layer.

\* \* \* \* \*